United States Patent [19]

Banghart

[11] 4,321,582
[45] Mar. 23, 1982

[54] DATA RETRIEVAL SYSTEM AND METHOD

[76] Inventor: Thomas S. Banghart, 1620 Highland Dr., Elm Grove, Wis. 53122

[21] Appl. No.: 129,388

[22] Filed: Mar. 11, 1980

[51] Int. Cl.³ .......................................... H04M 11/02
[52] U.S. Cl. .............................................. 340/310 R
[58] Field of Search ........................ 179/2 AM, 2 A; 340/310 A, 310 R

[56] References Cited

U.S. PATENT DOCUMENTS

| | | | |
|---|---|---|---|
| 3,842,206 | 10/1974 | Barsollotti | 179/2 A |
| 3,842,208 | 10/1974 | Paraskevakos et al. | 179/2 A |
| 3,873,961 | 3/1975 | Lee | 340/15.5 TS |
| 3,980,954 | 9/1976 | Whyte | 179/2 AM |
| 4,241,237 | 12/1980 | Paraskevakos et al. | 179/2 AM |

Primary Examiner—Terrell W. Fears
Attorney, Agent, or Firm—Fred Wiviott

[57] ABSTRACT

A data retrieval system and method is associated with an existing load management system and includes an encoder coupled to an information generating device associated with the load system being managed and a signal generator is coupled to the encoder. A control is coupled to the load management system and is operable upon the receipt from said system of a predetermined signal to couple to a telephone line and dial a predetermined number at the data center. The control is also operable to actuate the encoder for transmitting data by means of a signal generator over the telephone line to the data center upon receipt therefrom of a recognition signal.

7 Claims, 1 Drawing Figure

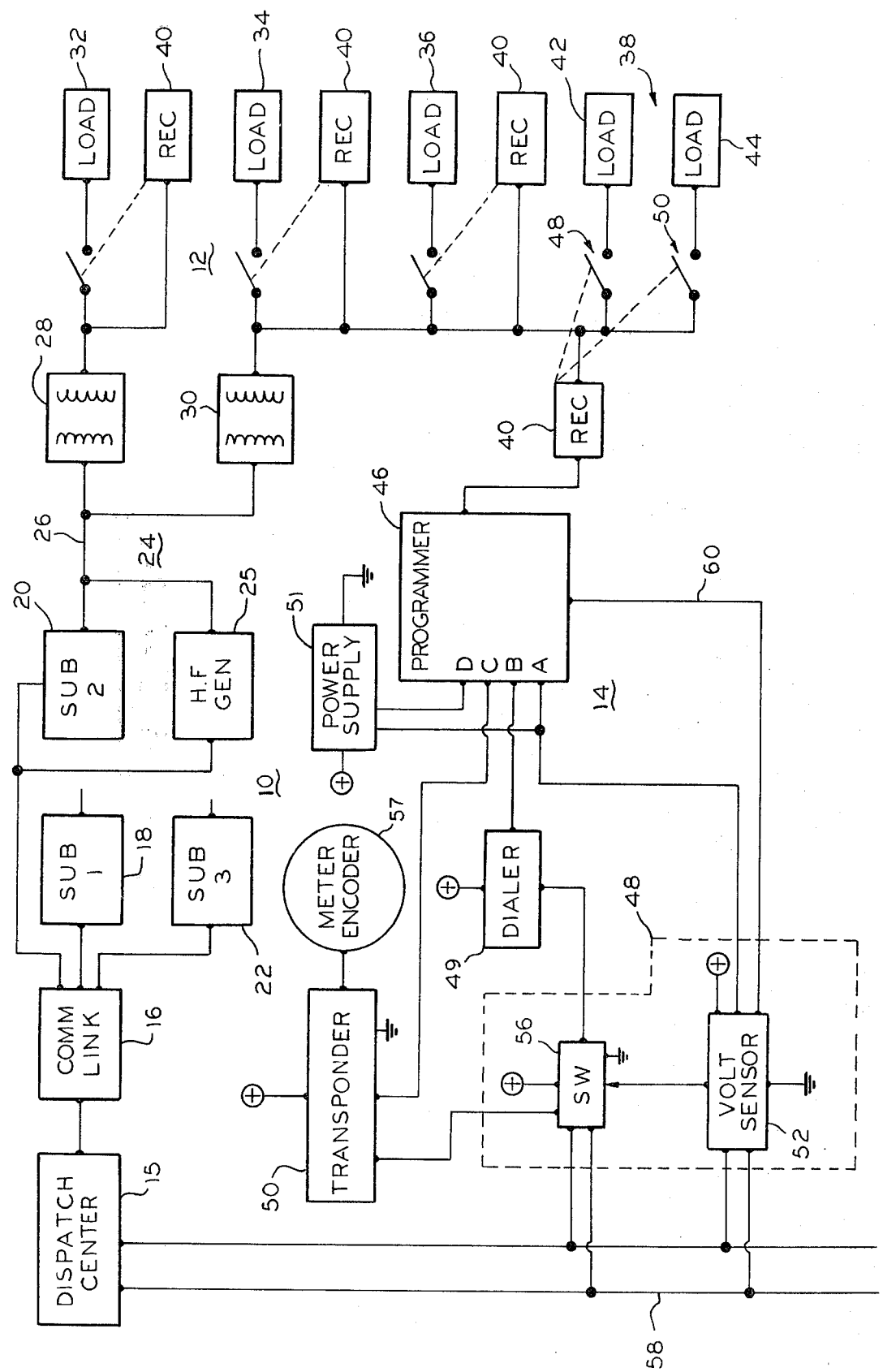

DATA RETRIEVAL SYSTEM AND METHOD

BACKGROUND OF THE INVENTION

This invention relates to data retrieval systems and more particularly to a system which is associated with conventional load management systems.

Load management systems are widely used by electrical utilities to accomplish various desirable end results, such as, for controlling peak loading. For example, such load management systems may remotely control interruptible loads such as air conditioners, heaters, and the like by transmitting command signals through the power transmission system or by radio. In addition, valuable data exists within the power transmission system, such as meter readings, load survey information, load distribution equipment status, and the like. However, two-way systems employing conventional load management techniques are not commonly employed because their cost is excessive in relation to the benefits that can be realized. For example, load management systems may employ high frequency or low frequency command signals. High frequency signals, however, tend to become absorbed by system power factor capacitors and accordingly require inductive traps and repeaters to build up the signal to noise ratio. In addition, because such high frequency signals do not readily pass through transformers, the command and information signals have to be applied beyond the last system transformer thereby requiring a signal generator at each substation. In addition, the input energy required for such systems is relatively high. In low frequency systems, information signals tend to be absorbed in various loads within the system. As a result, a relatively high power input and an expensive powerful transmitter is required at each data transmission point.

For these reasons, two-way systems using conventional load management techniques tend to be costly and technically complex thereby requiring considerable maintenance. Also, such systems tend to have limited flexibility. For example, because high frequency systems require injection of the signal at individual substations, load shifting between substations is thereby limited.

Another method of load management employs radio transmitters. These are not satisfactory for two-way systems, however, because of crowded ratio frequencies and range limitations. Also, load management systems employing telephone lines are not favored by electric utilities because control and switching equipment must be located at telephone companies' central offices, which is under the jurisdiction and control of the telephone utility.

SUMMARY OF THE INVENTION

It is an object of the invention to provide a data retrieval system and method employed with conventional load management systems and methods.

A further object of the invention is to provide a data retrieval system and method which is relatively inexpensive and compatible with existing load management systems and methods.

Yet a further object of the invention is to provide a data retrieval system and method operable with conventional load management systems and methods and which does not require expensive transmitters or high energy input at the data locations.

These and other objects and advantages of the present invention will become more apparent from the detailed description thereof taken with the accompanying drawing.

In general terms, the invention comprises a data retrieval system having coupling means connected to a transmission system to which an associated load management system is also connected. The data retrieval system is operable to receive a command signal from the load management transmitter and includes an encoder coupled to a data source associated with the transmission system and a control connected to the coupling means for receiving command signals and to the encoder. The control is operable upon receipt of the command signal to seize the telephone line and call a data center number. Upon receipt of a recognition signal from the data center, the control is operable to transmit a data signal to the data center from the encoder and to hang up upon the completion of the data transmission.

BRIEF DESCRIPTION OF THE DRAWINGS

The single FIGURE of the drawing schematically illustrates the data transmission system in accordance with the present invention.

BRIEF DESCRIPTION OF THE PREFERRED EMBODIMENT

Thhe drawing shows a distribution system 10 having a load management subsystem 12 and with which the information retrieval subsystem 14 of the present invention may be employed. The system 10 includes a dispatch center 15 connected by a communications link 16 to a plurality of substations 18, 20 and 22. Coupled to each substation is a distribution system 24 and a high frequency generator 25, although only the distribution system and generator coupled to substation 20 is shown for purposes of brevity.

The distribution system 24 includes a line 26 for coupling the substation 20 to a plurality of distribution transformers 28 and 30 which respectively service one or more leads. For example, transformer 28 may service load 32 and transformer 30 may service loads 34, 36 and 38. Also associated with each load is a load management receiver 40. For purposes of illustration, only the load management receiver associated with load 38 will be discussed in detail. As those skilled in the art will appreciate, the load 38 may include a plurality of individual loads 42 and 44, each of which may be connected to distribution transformer 30 by means of conductor 46 and individual switches 48 and 50. When it is desired to interrupt or otherwise control one or both of the individual loads 42 and 44, command signals will be sent from the dispatch center 15 by means of the communication link 16 through all parts of the distribution system. However, only those individual load receivers operable upon the receipt of a particular coded signal will be actuated. The signal will then be sensed by a receiver, such as 40, which will then operate, for example, to open or close the switches 48 and/or 50 thereby interrupting or reconnecting a portion of the load.

The circuitry described heretofore comprises a conventional load management system, the specific details of which form no part of the present invention. In addition, while a particular load management circuit operable for transmitting command signals over a power distribution line has been illustrated and described, those skilled in the art will appreciate that applicant's data retrieval system 14 may be employed with any conventional load management system such as those which use telephone lines or radio for transmitting command signals. What is important is that the system 12 be capable of transmitting a command signal which can be recognized by the data retrieval circuit 14.

As seen in the drawing, the data retrieval circuit 14 includes a programmer 46 which is also coupled to a receiver such as 40. It will be appreciated that while the data retrieval system 14 is shown to be coupled to the receiver associated with the load management system 12, a separate receiver for the data retrieval system may also be provided. If a separate receiver is employed, it will be connected to the power transmission in the same manner as receiver 40. It is obvious that if the command signals are transmitted by radio, receiver 40 will be a radio receiver.

Programmer 46 is of a well-known type operable upon receipt of an input signal to provide output signals from terminals A, B, C and D in a predetermined time sequence. The programmer terminals A, B and C are respectively connected to a line coupler 48, a dialer 49 and a transponder 50. Terminals A and D are also connected to a power supply 51. The line coupler 48 includes a voltage sensor 52 and a coupling switch 56, each of which is connected to the customer telephone line 58. In addition, the voltage sensor is connected to programmer terminal A and to the coupling switch 56. Switch 56 is also connected to the dialer 49. Transponder 50 is connected to the meter encoder 57 and the customer telephone line 58 through switch 56. The power supply 51 is connected to programmer terminals A and D and to each of the circuit elements except programmer 46 which will be separately energized.

The operation of the data retrieval system 14 will now be described. When it is desired to read the meter 57, for example, a command signal will be sent from dispatch center 15 through communication link 16, to energize high frequency generator 25 for delivering the required command signal to the transmission line 26. This signal will contain the appropriate address to actuate receiver 40 which in turn provides the command signal to programmer 46. If a common receiver 40 is employed both for load management and data retrieval, the command signal for programmer 46 will not actuate switches 48 or 50.

Upon being actuated, the programmer 46 will begin its signal sequanec. Initially, a signal will appear at terminal A to energize power supply 51 and provide an actuating signal to the voltage sensor 52. If the telephone line 58 is not in operation, voltage sensor 52 will sense the appropriate voltage condition of line 58 and provide an actuating signal to coupling switch 56. After an interval of sufficient length to assure presence of the dial tone, programmer 46 will provide a signal at terminal B which will actuate dialer 49. The latter circuit then dials the correct number at the dispatch center 15 to thereby couple the data retrieval system 14 to the appropriate data storage bank at center 15. After an interval of sufficient length to allow the dialer 49 to deliver either dialing pulses or the proper tone signals and to complete the call to dispatch center 15, a third signal will appear at programmer terminal C. This time delay will be about five seconds in the case of a pushbutton system and ten seconds in the case of a dial system. The appearance of a signal at terminal C will actuate transponder 50 which interrogates the meter encoder 56 and provides a meter data to the telephone line 58. The meter encoder and transponder may be of any well-known type and, accordingly, will not be described in detail for the sake of brevity. For example, one such encoder and transponder is disclosed in IEEE Conference Paper No. C73 071-8, entitled *Defining A Communications System For Automatic Data Collection From Utility Meters* by Victor E. Stewart, Nov. 30, 1972.

After a further time interval of sufficient length to permit the data to be transmitted to the dispatch center, a signal will appear on programmer terminal D to open the power supply 51 then thereby deactivate the transponder 50, the voltage sensor 52 and to open the line coupling switch 56.

It will be appreciated that the command signal to data retrieval circuit 14 may be sent separately from the load control signals used to control the various loads 32, 34, 36 and 38 and further that such command signals may be sent simultaneously or sequentially to a number of data collection points throughout the system. Further, the receiver for programmer 46 may be associated with a particular load, such as shown in the drawings, or may be at a separate location. Further, command signals may be transmitted not only through a distribution system, such as that shown in the drawing, but also by means of radio transmission.

If the telephone line 58 is busy as sensed by the voltage sensor 52, the line coupling switch will not be closed and dialer 49 and transponder 50 will not be connected to the telephone line 58. In addition, a feedback circuit 60 may be connected from the voltage sensor to the programmer for recycling the programmer after a predetermined time delay. Alternatively, upon receipt of the signal at feedback line 60, programmer may be programmed to provide a signal at terminal D which deactivates the system until a subsequent command signal is received.

As an alternative to actuating the transponder a predetermined time after the appearance of a signal on terminal B initiates the operation of dialer 49, the programmer may be coupled to the telephone line for being responsive to a recognition tone or "handshake" signal from the dispatch center.

While only a single embodiment of the invention has been illustrated and described, it is not intended to be limited thereby, but only by the scope of the appended claims.

I claim:

1. In combination, a load management system including means for transmitting command signals from a central location by a first command signal transmission path to one or more receivers located at load stations associated with a power transmission system, a data retrieval system coupled to the first command signal transmission path, a telephone system extending from said load stations to said central location separate from said first command signal transmission path, said data retrieval system also being coupled to said telephone system, a data receiver at said central location, the data retrieval system including a control and a telephone line coupler, calling means at each of said load stations for completing a signal path through said telephone system to the data receiver at said central location, a data source, a signal generator coupled to the data source and to the control, said control being operable to actuate said line coupler upon receipt of a command signal through said first command signal transmission path, said control being operable to actuate said calling means for calling said data center for establishing a signal path thereto, said control also being operable upon establishment of the signal path to the data receiver to actuate said signal generator, said signal generator being operable upon being actuated for providing a signal to the telephone system.

2. The combination set forth in claim 1 wherein said first command signal transmission path comprises an electrical distribution system having a power line carrier load management system.

3. The combination set forth in claim 1 wherein said first comand path transmission system comprises a radio transmitter, radio receiver associated with said control, said control being coupled to said radio receiver.

4. The combination set forth in any claims 1-3 wherein said control is coupled to said telephone line and is operative upon receipt of a recognition signal from said data center to actuate said signal generator.

5. A method of data retrieval including the steps of:

generating a carrier command signal at a central location of an electric distribution system, transmitting said command signal through said electrical distribution system and from said central location to a load station associated with said electrical distribution system, sensing said command signal at said load station and actuating a telephone line coupler associated with said load station upon receipt of a command signal, establishing a signal path through a telephone system extending from the load station to said central location and separate from said electric distribution system, transmitting a data signal from said load station to said central location and through said signal path upon completion of said path.

6. A method of data retrieval including the steps of:

generating a command signal at a central location of an electric distribution system, transmitting said command signal by a radio transmitter and from said central location to a radio receiver located at a load station associated with said electrical distribution system, sensing said command signal through said receiver at said load station and actuating a telephone line coupler associated with said load station upon receipt of a command signal, establishing a signal path throgh a telephone system extending from the load station to said central location to said load station and separate from said radio transmission system, transmitting a data signal from said load station to said central location and through said signal path upon completion of said path.

7. The method set forth in claims 5 or 6 and including the step of providing a recognition signal from said central location upon completion of said signal path, said data signal being generated upon receipt of said recognition signal.

* * * * *